United States Patent
Uehara et al.

[11] Patent Number: 6,118,905
[45] Date of Patent: Sep. 12, 2000

[54] IMAGE DATA PROCESSING THROUGH CHANGING ERROR DIFFUSING TECHNIQUE DEPENDING UPON KIND OF IMAGES

[75] Inventors: Hisao Uehara, Ogaki; Mitsugu Kobayashi, Nagoya; Makoto Fujioka, Ogaki; Kenji Saiki, Anpachi-gun; Makoto Kitagawa, Gunfu; Yusuke Tsutsui, Motosu-gun, all of Japan

[73] Assignee: Sanyo Electric Co., Ltd., Osaka, Japan

[21] Appl. No.: 08/591,837

[22] Filed: Jan. 19, 1996

[51] Int. Cl.[7] .............................. G06K 9/36; G06K 9/38; G06K 9/46
[52] U.S. Cl. ..................... 382/252; 382/162; 358/447; 358/448; 358/530
[58] Field of Search ................................. 382/252, 266, 382/162; 358/447, 448, 455, 456, 530, 532, 534

[56] References Cited

U.S. PATENT DOCUMENTS

| | | | |
|---|---|---|---|
| 4,672,368 | 6/1987 | Williams | 345/186 |
| 5,068,914 | 11/1991 | Klees | 382/275 |
| 5,155,594 | 10/1992 | Bernstein et al. | 348/411 |
| 5,170,152 | 12/1992 | Taylor | 345/155 |
| 5,254,982 | 10/1993 | Feigenblatt et al. | 345/148 |
| 5,283,646 | 2/1994 | Bruder | 348/415 |
| 5,289,294 | 2/1994 | Fujisawa | 358/461 |
| 5,450,098 | 9/1995 | Oz | 345/154 |

OTHER PUBLICATIONS

Robert Floyd, et al., "An Adaptive Algorithm for Spatial Grey Scale", SID 75 Digest, pp. 36–37.
M. Hirose, et al., "5–bit TV Pictures on 3–bit Color TFT–L-CDs Using Alternating Dither", SID 92 Digest, pp. 597–600.
M. Kobayashi, et al., "Multi–Gray–Level Method for TFT–LCD Using Enhanced Error Diffusion", SID 93 Digest, pp. 475–478.

*Primary Examiner*—Thomas D. Lee
*Attorney, Agent, or Firm*—Loeb & Loeb, LLP

[57] ABSTRACT

An image processing apparatus detects, in step 1, whether or not differences between currently supplied image data and image data of a previous pixel are more than a predetermined value m, and identifies a border of a computer-created image or a natural image, where a brightness level differs from the remaining area of the image, when the differences are more than the predetermined value m. Conversely, when the differences are less than the predetermined value m, the image processing apparatus checks, in step 2, whether image data at a pixel before and a pixel two before the current pixel are identical with respect to the color components constituting the color image. When the differences are not all zero, it is checked whether or not the image data at a pixel before the current pixel and the image data at the current pixel are all zero. When the image data are not identical, the color image is identified as being a natural image. When the image data are identical, the color image is identified as being a computer-created image. In step 3, the computer-created image is checked as to whether it is a 2-pixel checkered image.

17 Claims, 10 Drawing Sheets

Fig. 2A

| n-4 | n-3 | n-2 | n-1 | n | n+1 | n+2 | n+3 |
|---|---|---|---|---|---|---|---|
| Da1 | Da2 | Da3 | Da4 | Db1 | Db2 | Db3 | Db4 |

Fig. 2B

| n-4 | n-3 | n-2 | n-1 | n | n+1 | n+2 | n+3 |
|---|---|---|---|---|---|---|---|
| Da | Da | Da | Da | Db | Db | Db | Db |

Fig. 2C

| n-4 | n-3 | n-2 | n-1 | n | n+1 | n+2 | n+3 |
|---|---|---|---|---|---|---|---|
| Db | Da | Db | Da | Db | Da | Db | Da |

Fig. 2D

| n-4 | n-3 | n-2 | n-1 | n | n+1 | n+2 | n+3 |
|---|---|---|---|---|---|---|---|
| Db | Db | Da | Da | Db | Db | Da | Da |

Fig. 7A

| PRESET DATA | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 14 | 1 | * | | | | | | | | | | | | | | | |
| 8 | 2 | | | | | | | * | | | | | | | | | |
| 2 | 3 | | | | | | | | | | | | | * | | | |
| 12 | 4 | | | * | | | | | | | | | | | | | |
| 6 | 5 | | | | | | | | * | | | | | | | | |
| 0 | 6 | | | | | | | | | | | | | | | | * |
| 10 | 7 | | | | | * | | | | | | | | | | | |
| 4 | 8 | | | | | | | | | | | * | | | | | |
| 14 | 9 | * | | | | | | | | | | | | | | | |
| 8 | 10 | | | | | | | * | | | | | | | | | |
| 6 | 11 | | | | | | | | | | | | | * | | | |
| 12 | 12 | | | * | | | | | | | | | | | | | |
| 6 | 13 | | | | | | | | * | | | | | | | | |
| 0 | 14 | | | | | | | | | | | | | | | * | |
| 10 | 15 | | | | | * | | | | | | | | | | | |
| 4 | 16 | | | | | | | | | | | * | | | | | |

Fig. 7B

ERROR DATA BEING "1"

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | | | | | | | | | | | | | # |
| 2 | | | | | | # | | | | | | | | | | |
| 3 | | | | | | | | | | | | # | | | | |
| 4 | # | | | | | | | | | | | | | | | |
| 5 | | | | | | | # | | | | | | | | | |
| 6 | | | | | | | | | | | | | | # | | |
| 7 | | | | | # | | | | | | | | | | | |
| 8 | | | | | | | | | | # | | | | | | |
| 9 | | | | | | | | | | | | | | | | # |
| 10 | | | | | # | | | | | | | | | | | |
| 11 | | | | | | | | | | | | # | | | | |
| 12 | # | | | | | | | | | | | | | | | |
| 13 | | | | | | | | # | | | | | | | | |
| 14 | | | | | | | | | | | | | | # | | |
| 15 | | # | | | | | | | | | | | | | | |
| 16 | | | | | | | | | | # | | | | | | |

Fig. 8A

| PRESET DATA | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 14 | 1 | * | | | | | | | | | | | | | | | |
| 11 | 2 | | | | * | | | | | | | | | | | | |
| 8 | 3 | | | | | | | * | | | | | | | | | |
| 5 | 4 | | | | | | | | | | * | | | | | | |
| 2 | 5 | | | | | | | | | | | | | * | | | |
| 15 | 6 | | | | | | | | | | | | | | | | * |
| 12 | 7 | | | * | | | | | | | | | | | | | |
| 9 | 8 | | | | | | * | | | | | | | | | | |
| 6 | 9 | | | | | | | | | * | | | | | | | |
| 3 | 10 | | | | | | | | | | | | * | | | | |
| 0 | 11 | | | | | | | | | | | | | | | * | |
| 13 | 12 | | * | | | | | | | | | | | | | | |
| 10 | 13 | | | | * | | | | | | | | | | | | |
| 7 | 14 | | | | | | | * | | | | | | | | | |
| 4 | 15 | | | | | | | | | | * | | | | | | |
| 1 | 16 | | | | | | | | | | | | | * | | | |

Fig. 8B

ERROR DATA BEING "8"

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | # | | # | | # | | # | | # | | # | | # | | # |
| 2 | # | | # | | # | | # | | # | | # | | # | | # | |
| 3 | | # | | # | | # | | # | | # | | # | | # | | # |
| 4 | # | | # | | # | | # | | # | | # | | # | | # | |
| 5 | | # | | # | | # | | # | | # | | # | | # | | # |
| 6 | # | | # | | # | | # | | # | | # | | # | | # | |
| 7 | | # | | # | | # | | # | | # | | # | | # | | # |
| 8 | # | | # | | # | | # | | # | | # | | # | | # | |
| 9 | | # | | # | | # | | # | | # | | # | | # | | # |
| 10 | # | | # | | # | | # | | # | | # | | # | | # | |
| 11 | | # | | # | | # | | # | | # | | # | | # | | # |
| 12 | # | | # | | # | | # | | # | | # | | # | | # | |
| 13 | | # | | # | | # | | # | | # | | # | | # | | # |
| 14 | # | | # | | # | | # | | # | | # | | # | | # | |
| 15 | | # | | # | | # | | # | | # | | # | | # | | # |
| 16 | # | | # | | # | | # | | # | | # | | # | | # | |

Fig. 9A — PRESET DATA

Fig. 9B — ERROR DATA BEING "4"

Fig. 10A — PRESET DATA

Fig. 10B — ERROR DATA BEING "5"

| PRESET DATA | | 1 2 3 4 5 6 7 8 9 10 11 12 13 14 15 16 |
|---|---|---|
| 14 | 1 | * · · · · · · · · · · · · · · · |
| 1 | 2 | · · · · · · · · · · · · * · · |
| 4 | 3 | · · · · · · · · * · · · · · · |
| 7 | 4 | · · · · · * · · · · · · · · · |
| 10 | 5 | · · · * · · · · · · · · · · · |
| 13 | 6 | · * · · · · · · · · · · · · · |
| 0 | 7 | · · · · · · · · · · · · · * · |
| 3 | 8 | · · · · · · · · · · * · · · · |
| 6 | 9 | · · · · · · · * · · · · · · · |
| 9 | 10 | · · · · * · · · · · · · · · · |
| 12 | 11 | · · * · · · · · · · · · · · · |
| 15 | 12 | · · · · · · · · · · · · · · * |
| 2 | 13 | · · · · · · · · · · · * · · · |
| 5 | 14 | · · · · · · · · * · · · · · · |
| 8 | 15 | · · · · · · * · · · · · · · · |
| 11 | 16 | · · · * · · · · · · · · · · · |

Fig. 11A

ERROR DATA BEING "7"

| | 1 2 3 4 5 6 7 8 9 10 11 12 13 14 15 16 |
|---|---|
| 1 | · · # · # · # · · # · # · # · # |
| 2 | · # · · · # · # · # · # · # · # |
| 3 | # · · # · # · # · · # · # · # · |
| 4 | # · # · # · · # · # · # · · # · |
| 5 | · # · # · # · · # · # · # · # |
| 6 | # · · # · # · # · · # · # · # · |
| 7 | # · # · # · · # · # · # · · # · |
| 8 | · # · # · # · · # · # · # · · # |
| 9 | · # · # · # · # · · # · # · # · |
| 10 | # · · # · # · · # · # · # · · # |
| 11 | · # · # · # · # · # · · # · # |
| 12 | · # · # · # · # · # · · # · # |
| 13 | # · # · · # · # · # · # · · # · |
| 14 | · # · # · # · · # · # · # · · # |
| 15 | · # · # · · # · # · # · # · · # |
| 16 | # · # · · # · # · # · · # · # · |

Fig. 11B

IMAGE DATA PROCESSING THROUGH CHANGING ERROR DIFFUSING TECHNIQUE DEPENDING UPON KIND OF IMAGES

TECHNICAL FIELD

The present invention relates to a quantized continuous tone image processing apparatus which displays, in quantized continuous image tones, images having more bits than those represented by image display data of each pixel, and changes its error diffusion technique depending upon a kind of image during the quantized continuous tone image processing. Specifically, the apparatus employs different error diffusion techniques in accordance with a computer-created image and a natural image.

BACKGROUND OF THE INVENTION

Recently, high precision color liquid crystal displays (LCD) have been developed for promoting office automation (OA) using multi-media computers. Such an LCD includes a 3-bit or 4-bit digital driver so as to control gradations of red (R), green (G) and blue (B) colors for each pixel. For instance, a color LCD including the 4-bit digital driver can display each of the foregoing colors in eight gradations, i.e. it can display 512 colors (=8×8×8).

Such a digital driver having the foregoing color display capacity suffices for a simple OA monitor. However, it is not sufficient to display moving and still images used on a multimedia computer, and it has been required to display images having more gradations.

In order to meet this requirement, a variety of proposals have been made to diffuse image components, which cannot be displayed by one pixel, to adjacent pixels in the same image frame (i.e. inframe error diffusion) and to increase the number of gradations using a quantized continuous tone image processing technique.

In this specification, the term "error data" denotes data, out of image data, which are represented by lower bits and are not provided to a digital driver and are not displayed on an LCD. For example, image data are represented by six bits while the digital driver is four-bit, so the lower two bits are error data.

FIG. 12 of the accompanying drawings shows an example of the error diffusing apparatuses of the prior art. This error diffusing apparatus employs the inframe error diffusion technique, and processes data of one color image. This apparatus stores error data which are the lower bits of image data in one pixel and are not displayed on an LCD, and adds the error data to image data of a succeeding pixel. The apparatus performs the quantized continuous tone image processing using the error diffusing method.

Referring to FIG. 12, a latch circuit 11 latches 6-bit original image data GD arriving in synchronization with dot clocks DCK, and provides the image data GD to an arithmetic circuit 12. The arithmetic circuit 12 adds the image data GD and error data E1 from an error data storage circuit 13, creating corrected 6-bit image data. The error data storage circuit 13 stores the two lower bits of the corrected 6-bit image data in response to the dot clock DCK, and outputs the two lower bits to the arithmetic circuit 12 when original image data GD of a next pixel are latched in the latch circuit 11. Four higher bits of the corrected 6-bit image data are outputted as image display data HD to an output latch circuit 14. The image is displayed on the basis of the 4-bit image display data HD, and the two remaining lower bit error data are sequentially diffused into adjacent pixels. Thus, a halftone image is displayed since brightness levels of a plurality of pixels are averaged.

For example, assume that the original image data have a value of "100010" for all pixels. First of all, "00" of error data EI is added to the original image data "100010", so corrected 6-bit image data "100010" will be created. The two lower bits "10" of the corrected 6-bit image data are stored as error data EI in the error data storage circuit 13. The four higher bits "1000" are output as image display data HD. Then, the error data EI "10" is added to next original image data GD "100010", so corrected image data will be "100100". The error data EI "00" is stored, and image display data HD "1001" is outputted. The foregoing operation is repeated, so "1000" and "1001" are alternately displayed by each pixel. This means that two pixels display a halftone image. A quarter-tone image represented by the least significant bit (LSB) of the original image data GD is displayed by four pixels of corrected image data (i.e. one of four pixels of corrected image data has the least significant bit LSB which is 1).

The foregoing error diffusion is applied to the colors R, G and B, respectively, so each of them can be displayed in 64 (6 bits) gradations similarly to the original image data GD. This error diffusion technique is effective in remarkably improving the quality of a natural image which is moving or has varying color densities.

However, since the error data are laterally added in the foregoing error diffusion technique, data of a left image tends to adversely affect those of a right image, so image display data will be affected accordingly. When a displayed image is flat, error data which are caused by discontinuous variations of left image data affect the right image in a discernible manner. The left image tends to have a poor quality. For instance, when a cursor moves on a flat color background of a personal computer display, it seems as if it has a tail. In such a case, an error in the image data of the cursor appears at the right of the display screen far from the cursor itself, and an artifact appears there.

In order to overcome the foregoing problem, in the prior art, not only error data which are stored for every given pixels are periodically reset but also a border (i.e. an edge) of the image is detected. When the edge is detected, the existing error data are reset. Thus, the image is protected against being affected by irrelevant error data when it is displayed. Further, a difference between image data of a preceding pixel and image data currently supplied is calculated. If the difference is more than a given value, an image edge is identified.

However, if the error data are reset when an image edge is detected, no error data will be stored for an image after the detection of the edge, so the error diffusion is not effective for an image present around the edge. This tends to worsen the quality of the image. Especially, a computer-created image is sometimes displayed by superimposing flat images having different levels of tone or brightness. In such a case, an image around the edge (pixels succeeding the edge pixel) often suffers from poor quality. Further, if a line or the like having a slightly different brightness (e.g. the difference is represented by the number of bits in error data) is present in a flat image, a border of such a line is detected as an edge, on the basis of which error data may be reset. Thus, no carry signal is generated in the corrected image data on the basis of the resetting of the error data, so the line may not be displayed.

In the case of a computer-created image, different image data are alternately applied to every pixel so as to indicate an image having a tone or brightness which cannot be indicated by a display. Such an image is displayed by interpolated tone or brightness, and is called a "checkered pattern". Further, there is a checkered pattern formed by using two pixels. Since error data are periodically reset in the checkered pattern, the carry signals are generated at certain pixels by addition of the error data. This carry causes a particular pattern.

Therefore, it is preferable to change the contents of the error diffusion in accordance with the contents of the computer-created image.

SUMMARY OF THE INVENTION

Regardless of a natural image or a computer-created image, an edge of the image can be identified when there is a relatively large brightness difference between images in adjacent pixels. Around the edge, images are not correlative to each other. The natural and computer-created images are processed in a similar manner. On the other hand, when there is no, or only a slight, brightness difference between images in adjacent pixels, the natural and computer-created images are differently processed (e.g. using different error diffusion techniques).

With the natural image, adjacent pixels do not have exactly the same image data, i.e. all of the color components (R, G, B) are not identical to one another. Conversely, adjacent pixels usually have identical image data with respect to a computer-created image. Thus, it is possible to identify the natural image and the computer-created image by checking whether or not the image data in adjacent pixels are completely identical in all of the color components.

For instance, a difference between image data at a current pixel and image data at a previous pixel is calculated. When the difference is more than a predetermined value m, an image edge having a large brightness difference is identified. This edge identification is performed for both the natural image and the computer-created image.

When the foregoing difference is less than the predetermined value m, it is checked whether or not the image data regarding color components at two pixels are completely identical. When they are completely identical, a computer-created image will be recognized. Otherwise, a natural image will be recognized.

In another example, when a difference between currently supplied image data and image data at a pixel before the current pixel is less than the predetermined value m and when an edge is not identified, image data at a pixel two before the current pixel and image data at a pixel before the current pixel are compared. When these image data are recognized as being identical for all of the color components, the image is recognized to be a computer-created image.

Further, when the image data at the pixel before and the pixel two before the current pixel are not recognized as being identical, currently supplied image data and the image data at a pixel before the current pixel are compared, i.e. it is checked whether or not both of the image data are completely identical for all the color components constituting the image. If both of the image data are recognized as being identical with respect to at least a color component, the image will be recognized as being a natural image.

When both of the image data are identical for all of the color components, it is considered that a computer-created image has been present since a pixel before the current pixel. In other words, the image may have either a two-pixel checkered pattern or a continuous image after an edge. Then, it is checked whether or not a difference between image data at the current pixel and image data at a next pixel is more than the predetermined value m. When the difference is more than the predetermined value m, the identical image data are present in the two pixels, and then are changed to different image data in a next pixel. The image is identified as being a two-pixel checkered pattern.

When the foregoing difference is less than the predetermined value m, the image is identified as being a computer-created image in which identical image data are present in two pixels, and image data at a next pixel have a small brightness difference.

In an image processing apparatus according to the present invention, a difference between image data at a current pixel and image data at a pixel before the current pixel is calculated by a delay circuit, for delaying the current image data by one dot clock, and a subtractor. The derived difference is compared with the predetermined value m by a comparator. When the difference is less than the predetermined value m, it is checked whether or not the difference is 0. A first signal indicative of the difference being larger than m is stored in a first storage circuit during one dot clock. The first storage circuit generates an output signal indicative of a difference between the current image data and image data at a pixel before the current pixel. Further, the first storage circuit has an input signal indicative of the difference between the current image data and image data at a next pixel.

A second signal indicative of the difference being 0 in the comparator circuit is stored in a second storage circuit during one dot clock and a next dot clock. Thus, the second storage circuit generates an output signal indicating whether or not image data at a pixel and two pixels before the current pixel are identical, and whether or not the current image data are identical to the image data at a pixel before the current pixel.

A first AND circuit detects that the image data are identical in a pixel and two pixels before the current pixel for all the color components. A second AND circuit detects that image data at the pixel before the current pixel and current image data are identical for all the color components. A logic circuit generates a signal indicative of an identified result on the basis of the first signal of the comparator, a signal of the first storage circuit, a signal of the second storage circuit, an output signal of the first AND circuit, and an output signal of the second AND circuit.

Further, when used with the foregoing image identifying apparatus, the error diffusing apparatus changes its error diffusing techniques depending upon a signal indicative of identified results from the logic circuit. The selector circuit and carry-preventing circuit of the error diffusing apparatus are controlled in response to this signal.

With a computer-created image, the error diffusing apparatus controls the operation for adding created error data to the image data and that for preventing the carry caused by the addition of the created error data. In the case of a natural image, the error diffusing apparatus controls the operation for adding the error data stored in the error data storage circuit to the image data.

The error diffusing apparatus calculates error data assuming that image data, which are identified as denoting a border of an image, has been continuously present up to now, and stores the calculated (created error data) error data as error data to be added to image data of a next pixel.

The image data of the current pixel are displayed as they are, while created error data are added to image data at the next pixel to a border pixel so as to prevent the image from being degraded at an edge thereof.

The foregoing error diffusion is applied to 1-pixel and 2-pixel checkered patterns, thereby preventing inappropriate error diffusion.

As for a flat portion of the computer-created image, the error diffusion is performed based on current image data by assuming that they are considered to be continuously present.

In the case of the natural image, the error diffusion will be performed in an ordinary manner, i.e. the error data are periodically reset. According to the present invention, error data reset periods are determined on the basis of error data in current image data.

According to the present invention, it is possible to detect an edge of a natural or computer-created image whose brightness differs remarkably from other portions of the image, and to accurately identify the computer-created image. Further, with respect to the computer-created image, it is possible to accurately detect whether or not the computer-created image is completely flat, or whether it is a 1-pixel or 2-pixel checkered pattern. Therefore, a combination of the image identifying method, the image identifying apparatus and the error diffusion techniques depending upon the kind of image advantageously prevents not only an irrelevant left image affecting a right image, but also particular artifacts which are generated in a 1-pixel or 2-pixel checkered pattern by the error diffusion.

The present invention contributes to improving the quality of a screen display in which a computer-created image and a natural image coexist and are displayed on an LCD having a limited number of gradations.

BRIEF DESCRIPTION OF THE DRAWINGS

FIGS. 2A, 2B, 2C and 2D show patterns of image data to be identified in the embodiment shown in FIG. 1.

FIGS. 7A and 7B schematically show a first reset pattern and a screen display.

FIGS. 8A and 8B schematically show a second reset pattern and a screen display.

FIGS. 9A and 9B schematically show a third reset pattern and a screen display.

FIGS. 10A and 10B schematically show a fourth reset pattern and a screen display.

FIGS. 11A and 11B schematically show a fifth reset pattern and a screen display.

DESCRIPTION OF THE PREFERRED EMBODIMENT

Figure 1:
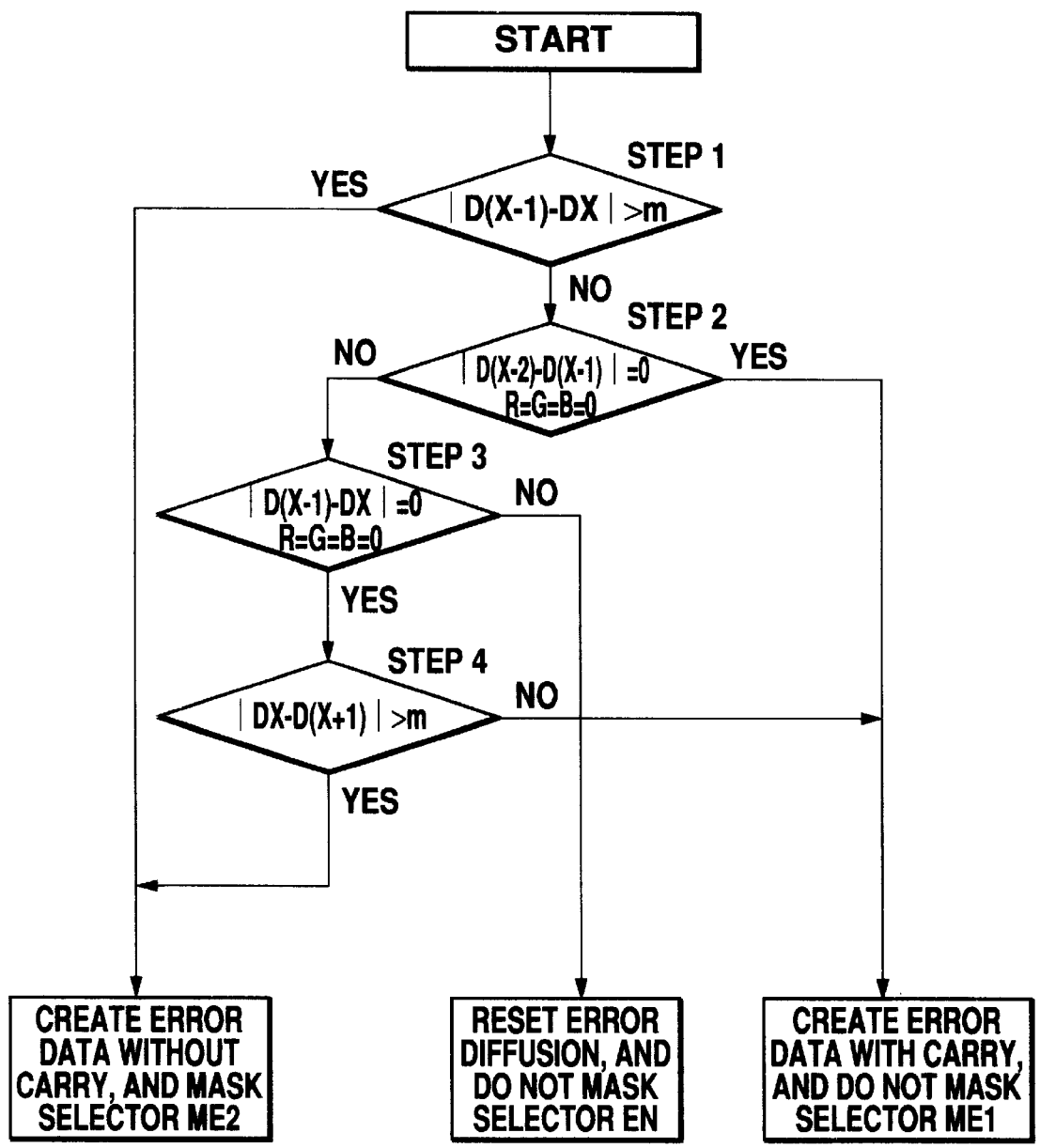
FIG. 1 is a flow chart showing an operation sequence of an image processing apparatus according to an embodiment of the present invention.

Image processing is carried out according to a sequence shown in the flowchart of FIG. 1. A color image constituted by signals indicative of the color components R, G and B are processed in this embodiment. Further, images patterns shown in FIGS. 2A to 2D are respectively identified in this image processing.

FIGS. 2A to 2D respectively show image data columns for one color component, and actually three color components, R (red), G (green) and B (blue) exist. The image data are respectively shown in rectangles indicative of pixels (n−4 to n+3) per horizontal line.

FIG. 2A shows a natural image. Image data in the pixels n−4 to n−1 are Da1, Da2, Da3 and Da4 have different values. In this example, a difference of the image data in every two adjacent pixels is less than a predetermined value m. Further, a difference of the image data in every two adjacent pixels before the pixel n−4 is also less than m.

A difference of the image data Db1, Db2, Db3 and Db4 in every two adjacent pixels is less than m with respect to the pixels n to n+3. In this example, a difference between the image data Da4 of the pixel n−1 and the image data Db1 of the pixel n is more than m, which implies the presence of an edge.

The image data of the pixels up to the pixel n−1 are correlative to each other in every two adjacent pixels and vary moderately. The image data of the pixels succeeding the pixel n are correlative to each other in every two adjacent pixels and vary moderately. However, they are not correlative around the edge (i.e. between the pixel n−1 and the pixel n).

Examples of computer-created images are shown in FIGS. 2B, 2C and 2D. Referring to FIG. 2B, the same image data Da is present from pixels preceding the pixel n−4 to the pixel n−1, and the image data Db is present in the pixel n and succeeding pixels. The difference between the image data in the pixels n−1 and n is more than m, which indicates the presence of an edge.

In FIG. 2C, the image data Da and Db whose difference is more than m are alternately present in pixels preceding the pixel n−4 and succeeding pixels. This image pattern is used so as to create a halftone flat image, which cannot be indicated by one item of image data in limited bits, on a computer display. In other words, halftone colors can be obtained by alternately outputting, to each pixel, the image data Da and Db having the difference of more than m. This pattern is called a "checkered pattern".

FIGS. 2D also shows a pattern for obtaining a halftone color. For this pattern, the image data Da and Db having a difference more than m are alternately arranged in every two pixels. A checkered pattern using two pixels is created. In this case, pixels preceding the pixel n−4 also have the similar pattern.

When both the natural image and the computer-created images shown in FIGS. 2A to 2D coexist on a multi-media computer display screen, the image data should be error-diffused in accordance with the kinds of images. Otherwise, the foregoing problem is inevitable.

In order to overcome this problem, the image patterns are identified so as to perform the corresponding error diffusion.

The present error diffusing method will be described with reference to FIG. 1. In step 1, an absolute value of a difference between received image data DX (X denotes a pixel position) and image data D(X−1) of a pixel before the pixel X is calculated first of all. When this difference is more than the predetermined value m, it is identified that the current pixel is an image edge. In other words, in step 1, an answer is affirmative when the image data of the pixel n are provided in the examples shown in FIGS. 2A and 2B, when the image data of every pixel are provided in the example of FIG. 2C, and when the image data of the pixels n−4, n−2, n and n+2 are provided in the example of FIG. 2D.

In the foregoing case, all of the error data which have been stored until the image edge is identified are reset. New error data are created and added to image data after the edge is detected. The image data of a pixel next to the current pixel to which the error data are added do not undergo the carry in this case. This means that image display data are the same as corresponding upper bits of original image data. Details of this process will be described in detail later.

Detection in step 2 is performed when, in step 1, the foregoing difference is less than the predetermined value m with respect to all the pixels except for the pixel n in the example of FIG. 2A, all the pixels except for the pixel n in the example of FIG. 2B (however, the pixel n is included if a difference between the image data Da and Db is less than m), or the pixels n−3, n−1, n+1 and n+3 in the example shown in FIG. 2D.

In step 2, calculation is performed so as to derive an absolute value of a difference between image data D(X−2) of two pixels before the pixel X (currently receiving the image data) and image data D(X−1) of a pixel before the pixel X. It is checked whether or not the derived difference is "0". In other words, it is checked whether or not the two image data are identical. This checking process is performed for all the color components (R, G and B) constituting the color image.

If the foregoing checking process is performed only for image data related to one color component, some natural images may have the identical image data. However, in most computer-created images, the image data are identified as being identical with respect to all of the color components R, G and B. Therefore, in the example shown in FIG. 2B, the image data in the pixels except for the pixel n+1 are identified as being identical with respect to all of the color components R, G and B. In such a case, an answer is affirmative in step 2.

As for the pixel n+1 shown in FIG. 2B, the answer is negative in step 4 (to be described later), which indicates a computer-created image.

When all of the image data are identified as being identical with respect to all of the color components R, G and B, they represent a computer-created image. Thus, error data to be added to the image data are created, thereby performing the error diffusion with the carry. The created error data are added to the original image data, and corrected image data are obtained from the sum. This will be described in detail later.

On the contrary, when the image data are not identified as being identical for any of the color components R, G and B in step 2, it is checked whether or not an absolute value of the difference between the current image data DX and the previous image data DX−1 is "0". In other words, it is checked whether the image data are identical and whether this applies to all of the color components R, G and B. The image data are not identical in the case of the natural image shown in FIG. 2A. In this case, the error diffusion with a usual reset operation is performed. The image data are identified as being identical in the case of the pixel n+1 in the example of FIG. 2B, and the pixels n−3, n−1, n+1 and n+3 in the example of FIG. 2D. Thereafter, succeeding detection is performed in step 4.

In step 4, it is checked whether or not an absolute value of a difference between the error data DX and succeeding error data D(X+1) is more than the predetermined value m. This difference is more than m when the image data represent a checkered pattern using two pixels shown in FIG. 2D. In this case, the error diffusion is performed so as to create error data without the carry. On the other hand, the difference is less than m in the case of the pixel n+1 shown in FIG. 2B (in this case, a difference between the image data Da and Db is less than m). Thus, it is identified that the image data represent a computer-created image, and the error diffusion is conducted to create error data with the carry.

Steps 1 to 4 are performed so as to detect the edge having a large difference of brightness in an image, and to detect whether the image is either a natural or computer-created image. Especially, the 1-pixel checkered pattern and the 2-pixel checkered pattern can be processed similarly to the edge.

In the embodiment shown in FIG. 1, a variety of experiments have been performed. It is preferable to set the predetermined value m to be a value which can be represented by the most significant bit (MSB) of the error data in the error diffusion.

For instance, assume that image data have eight bits and four lower bits are used for the error data, and that the most significant bit in the four lower bits is 8, i.e. m=8. An edge of the computer-created image and that of the natural image can be identified in an optimum manner, thereby enabling the error diffusion to be performed effectively.

The following describe how an error is diffused in accordance with the image identification of the foregoing method.

Figure 3:
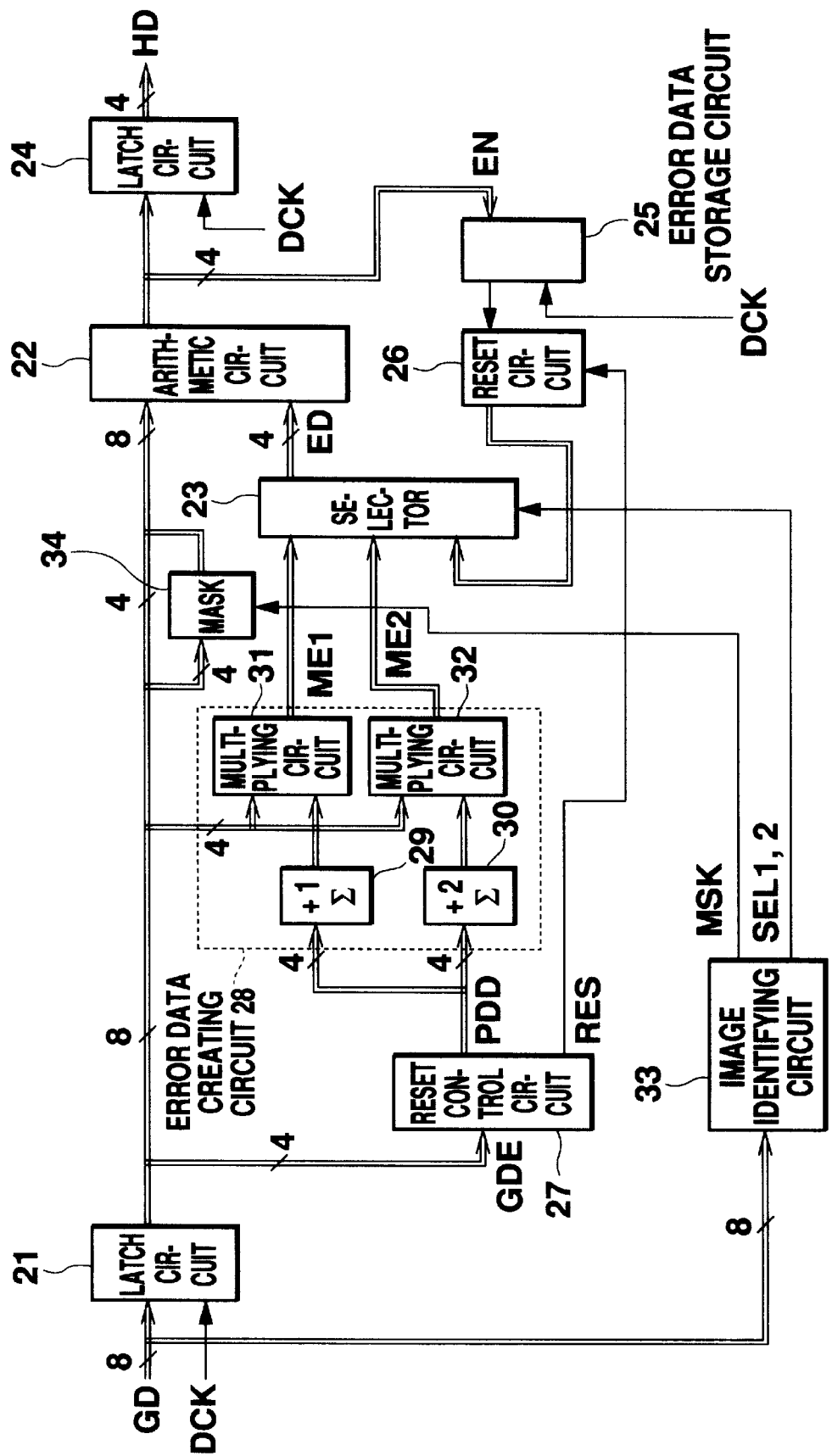
FIG. 3 is a block diagram showing the configuration of an error diffusing apparatus used in the embodiment of FIG. 1.

Each error diffusing apparatus is configured as shown in FIG. 3. The error diffusing apparatuses are disposed between output units for an original image having the colors R, G and B and LCD drivers for the respective colors. One error diffusing apparatus is used for each color, processes 8-bit original image data GD, creates 4-bit image display data HD, and provides them to a 4-bit input LCD driver.

In the error diffusing apparatus of FIG. 3, a latch circuit 21 sequentially stores 8-bit original image data GD which are inputted in synchronization with dot clocks DCK.

Specifically, the latch circuit 21 includes eight D-FF's (D-type flip flops). An arithmetic circuit 22 adds the image data GD from the latch circuit 21 and 4-bit error data ED from a selector 23. Thus, the arithmetic circuit 22 is an 8-bit adder.

Four higher bits of the 8-bit image data whose output has been processed by the arithmetic circuit 22 are stored in a latch circuit 24 in response to dot clocks DCK, and are then provided, as image display data HD, to the 4-bit input digital driver of the LCD. The latch circuit 24 includes four D-FF's.

The four lower bits of the 8-bit image data whose output has been processed by the arithmetic circuit 22 are provided to an error data storage circuit 25, as error data EN to be added to image data of a succeeding pixel. A reset circuit 26 receives the error data EN from the error data storage circuit 25, and sends a selector 23 either the error data EN as they are or data "0000", in response to an output RES from a reset control circuit 27. The error data storage circuit 25 includes four D-FF's, and is controlled in response to the dot clocks DCK. Thus, the error data storage circuit 25 stores the error data which have been present in a pixel before the current pixel.

On the basis of the four lower bits of the image data GD, i.e. the error data GDE, the reset control circuit 27 selects an optimal reset pattern corresponding to the error data, out of a plurality of reset patterns for determining a pixel position to reset the error data ED, thereby controlling the reset circuit 26. Further, the reset control circuit 27 sends an error data creating circuit 28 pixel distance data PDD which is indicative of a distance between the pixel of the image data GD stored in the latch circuit 21 and the reset pixel position determined by the selected reset pattern.

Receiving the pixel distance data PDD, the error data creating circuit 28 creates error data ME1 (which should be added to the pixel of the error data GD stored in the latch circuit 21) and error data ME2 (which should be added to image data GD of a next pixel), when the image data GD stored in the latch circuit 21 differ by more than m from the image data GD of a preceding pixel, i.e. when the image data GD stored in the latch circuit 21 are identified as denoting denote an edge. Then, it is assumed that image data GD which is identical to the current image data GD has been continuously supplied, and the error data creating circuit 28 creates the error data ME1 to be added to the image data of the current pixel, and the error data ME2 to be added to the image data of the next pixel.

The operation of the error data creating circuit 28 will be detailed later. The error data creating circuit 28 includes an adder 29 for adding "1" to the pixel distance data PDD, an adder 30 for adding "2" to the pixel distance data PDD, a multiplier 31 for multiplying the error data GDE (of the image data stored in the latch circuit 21) with an output of the adder 29, and a multiplier 32 for multiplying the error data GDE with an output of the adder 30. An output of the multiplier 31 is supplied to the selector 23 as the error data ME1, while an output of the multiplier 32 is supplied to the selector 23 as the error data ME2.

Depending upon the continuity or discontinuity of the image data GD, the selector 23 selects the error data ME1 or ME2, and the output supplied from the error data storage circuit 25 via the reset circuit 26. The operation of the selector 23 is controlled by the control signal SEL of an image identifying circuit 33 which employs the image identifying method shown in FIG. 1.

Specifically, the selector 23 selects the error data ME2 for the edge, and 1-pixel and 2-pixel checkered patterns in a computer-created image, the error data ME1 for other computer-created images, and the error data from the error data storage circuit 25 for the natural image.

A mask circuit 34 is disposed between the latch circuit 21 and the arithmetic circuit 22, and is connected with a signal line for the four lower bits of the 8-bit image data GD. The mask circuit 34 passes the error data GDE, or masks the error data GDE so as to apply data "0000" to the arithmetic circuit 22. The operation of the mask circuit 34 is controlled by the control signal MSK of the image identifying circuit 33 in accordance with the continuity or discontinuity of the image data GD.

When the error data GDE is masked, the error data ED selected by the selector 23 are added in the arithmetic circuit 22, but no carry signal is generated for the four higher bits. Therefore, the error data ED from the selector 23 are stored as they are in the error data storage circuit 25. Further, the error data ED are not added to the image data GD stored in the latch circuit 21. This will be described in detail later.

Figure 4:
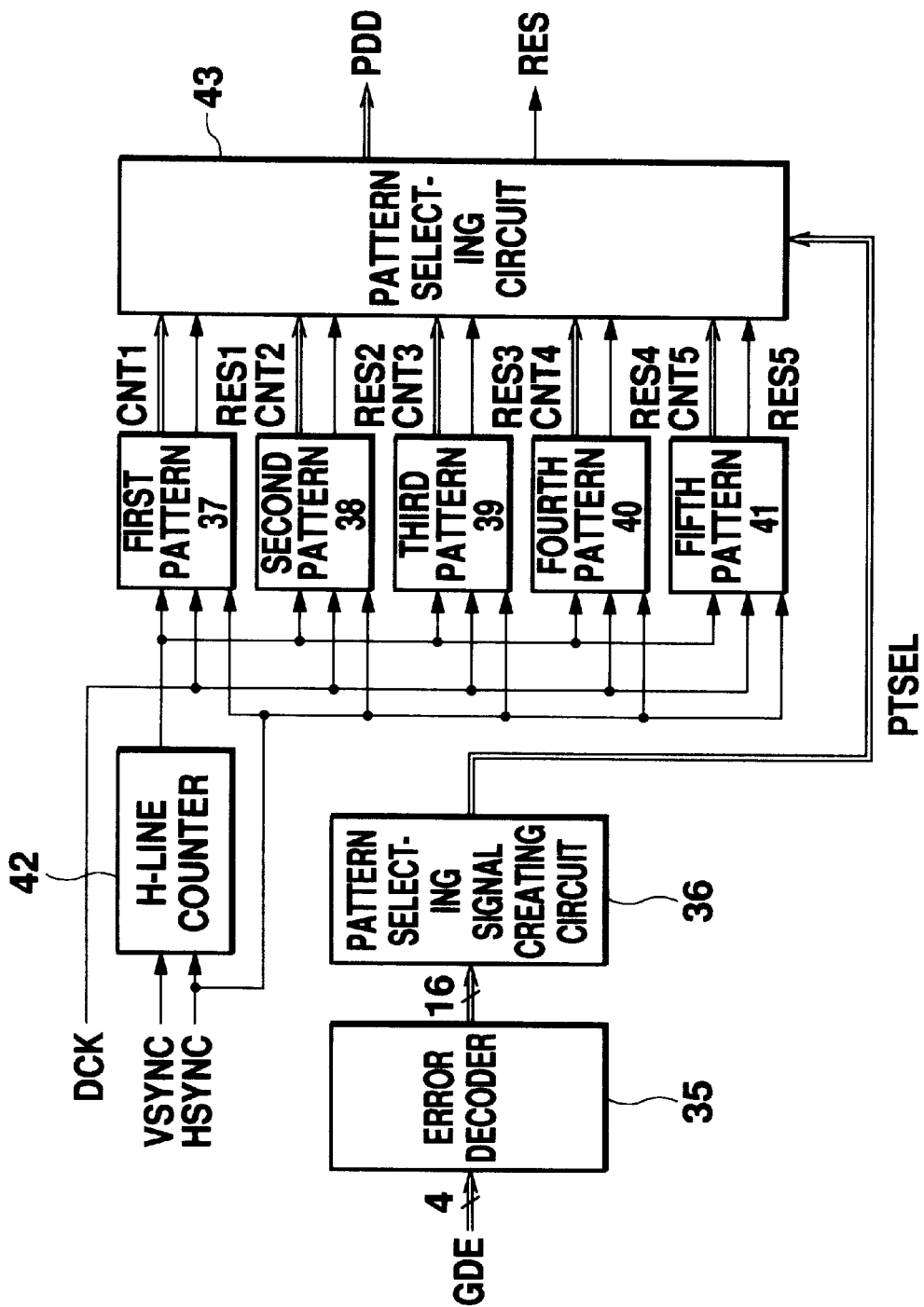
FIG. 4 is a detailed block diagram of a part of the error diffusing apparatus.

Referring to FIG. 4, the reset control circuit 27 comprises an error decoder 35 for decoding the 4-bit error data GDE and producing 16 decoding outputs, a pattern selecting signal generator 36 for generating signals for selecting one of five reset patterns in response to a decoding output, reset pattern creating circuits 37–41 for creating not only five reset patterns but also pixel distance data indicative of a distance of a current pixel from a reset pixel position, a 4-bit H line counter 42 for counting horizontal synchronous signals HSYNC, and a pattern selecting circuit 43 for selecting one of the reset pattern creating circuits 37–41 in response to a pattern selecting signal generated by the pattern selecting signal generator 36.

In this embodiment, the five reset patterns are available. The pattern selecting signal generator 36 generates pattern selecting signals PTSEL in response to the decoding output of the error decoder 35. Specifically, the pattern selecting signal generator 36 selects: the first reset pattern when the error data value is "1" and "15" ; the second reset pattern when the error data value is "2", "3", "8", "13" and "14"; the third reset pattern when the error data value is "4", "6", "10" and "12"; the fourth reset pattern when the error data value is "5" or "11"; and the fifth reset pattern when the error data value is "7" or "9".

The reset pattern creating circuits 37 to 41 create the first to fifth reset patterns, respectively, i.e. reset signals indicative of reset patterns for every horizontal line counted by the H-line counter 42. Thus, these circuits 37–41 determine pixel positions where the error data EN are reset in every horizontal line. The H-line counter 42 is reset in response to a vertical synchronous signal VSYNC, and repeatedly counts 16 horizontal lines by counting the horizontal synchronous signals HSYNC. Since the error data have four bits (i.e. maximum difference=16) in this embodiment, the reset pattern is set in an area defined by 16 pixels in the horizontal direction and 16 vertical lines (16 pixels×16 lines). This area (pattern area) is repeated on the display screen.

Figure 5:
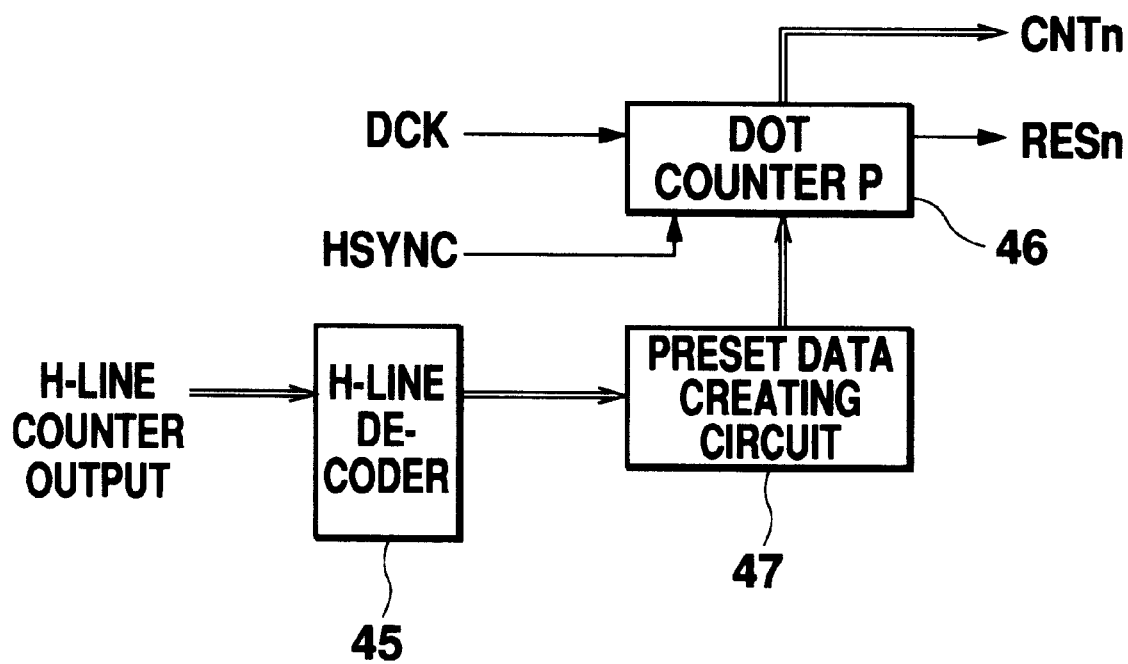
FIG. 5 is a detailed block diagram of a part of the error diffusing apparatus shown in FIG. 4.

Referring to FIG. 5, each of the reset pattern creating circuits 37–41 includes an H-line decoder 45 for decoding the count of the H-line counter 42, a 4-bit dot counter 46 for counting the dot clocks DCK, and a preset data creating circuit 47 for creating preset data which correspond to a horizontal line to be set in the dot counter 46 in accordance with an output of the H-line decoder 45.

The H-line decoder 45 detects the count of the H-line counter 42, i.e. detects which line in the pattern area should be displayed. The preset data creating circuit 47 creates preset data for respective lines in the pattern area. Preset data for a certain line are created in response to an output of the H-line decoder 45. The preset data are preset in the dot counter 46 in response to the horizontal synchronous signal HSYNC. Alternatively, it is possible to store the preset data of the lines beforehand, and to select one of them in accordance with an output from the H-line decoder 45.

The reset pattern creating circuits 37–41 use different preset data for the respective lines, and create the first to fifth reset patterns, respectively.

When the dot counter 46 indicates "15", it outputs a reset signal RESn. A count value CNTn of the dot counter 46 is supplied, as the pixel distance data, to the pattern selecting circuit 43.

Figure 6:
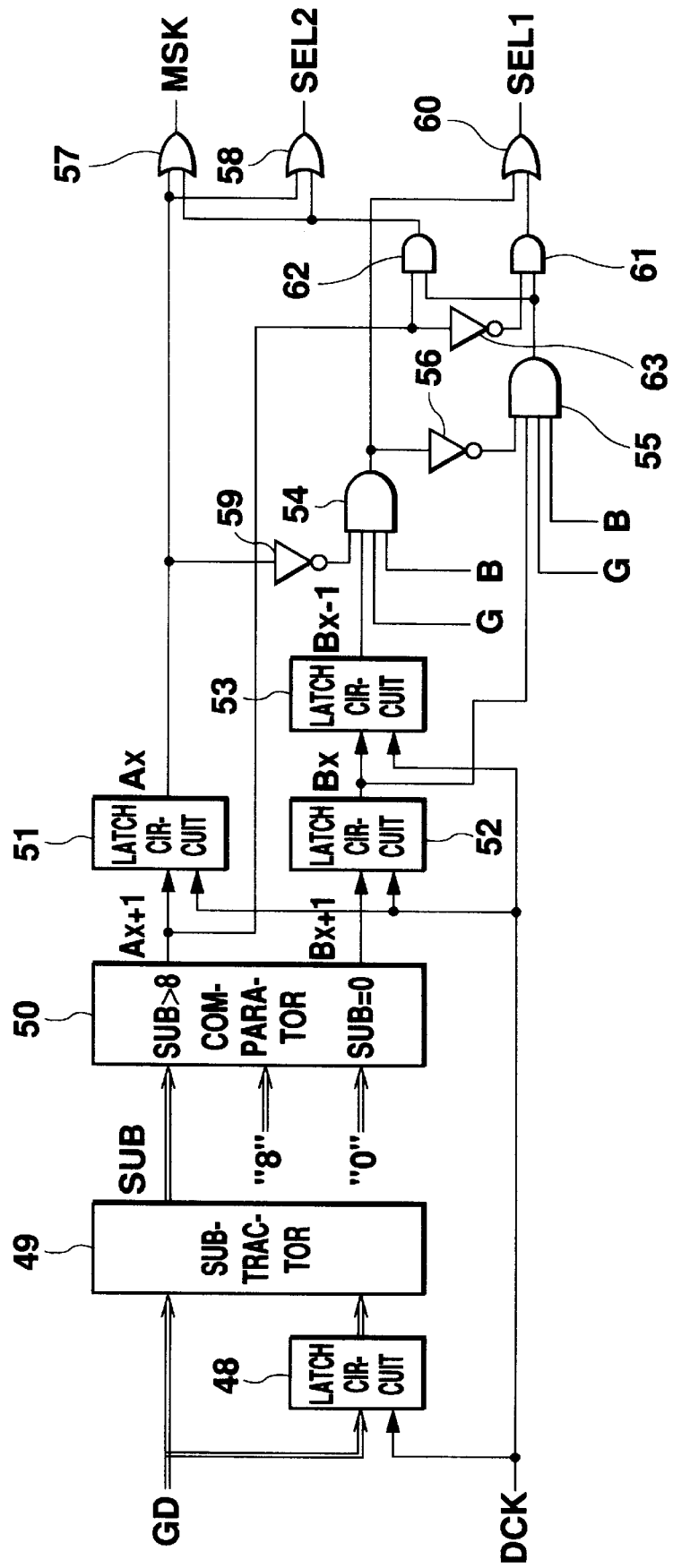
FIG. 6 is a detailed block diagram of an image identifying circuit shown in FIG. 3.
Figure 12:
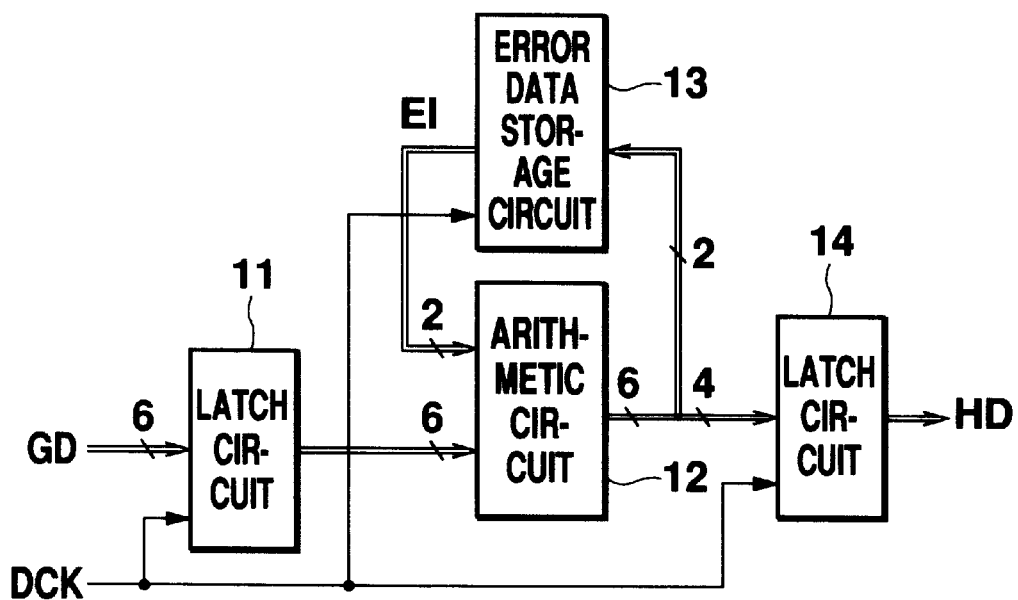
FIG. 12 is a block diagram of a conventional error diffusing apparatus.

The image identifying circuit 33 is configured as shown in FIG. 6. Referring to FIG. 6, a latch circuit 48 to which the image data GD is applied includes eight D-FF's. The latch circuit 48 is a delay circuit for delaying the image data by one clock period of the dot clock DCK. A subtractor 49 receives the current image data GD and image data of the previous pixel.

The subtractor 49 subtracts the current image data GD from the image data of the previous pixel, and supplies an absolute value output SUB to a comparator 50. The comparator 50 compares the absolute value output SUB with the predetermined value m (m=8 in this embodiment), and checks whether or not SUB is "0". When the output SUB is more than "8", the subtractor 49 sets a first signal A to the level H (in FIG. 6, a signal AX+1 is for an (X+1)-th pixel) to the level H. Conversely, when the output SUB is "0", the subtractor 49 sets a second signal B to the level H.

The first signal A is applied to a latch circuit 51 constituted by a D-FF. The latch circuit 51 stores the signal A during one clock period of the dot clock DCK. The latch circuit 51 functions as a first storage circuit.

The second signal B is applied to a latch circuit 52 including a D-FF. An output Bx of the latch circuit 52 is applied to a latch circuit 53 made of a D-FF. The latch circuits 52 and 53 constitute a second storage circuit for storing the signal B during one and two clock periods of the dot clock DCK. The second storage circuit functions as a one-and-two-dot-clock-period delay circuit. In FIG. 6, a signal BX+1 is for an (X+1)-th pixel.

Assume that an output Ax of the latch circuit 51 represents a signal indicative of an output for the pixel X, i.e. the remainder of (D(X−1)−DX). In this case, an output A of the comparator 50 represents the remainder of (DX−D(X+1)). On the other hand, the output Bx of the latch circuit 52 is a signal indicative of the remainder of (D(X−1) −DX). Further, an output Bx−1 of the latch circuit 53 is a signal indicative of the remainder of (D(X−2)−D(X−1)).

Thus, when the output Ax of the latch circuit 51 is for the pixel X, i.e. a signal indicative of the remainder of (D(X−1)−DX), the output A of the comparator 50 is a signal indicative of the remainder of (DX−D(X+1)). On the other hand, when the output Bx of the latch circuit 52 is a signal indicative of the remainder of (D(X−1)−DX), the output Bx−1 of the latch circuit 53 is a signal indicative of the remainder of (D(X−2)−D(X−1)).

An AND gate 54 functions as a first AND circuit, to which are applied not only the outputs Bx−1 indicative of color components R, G and B from the latch circuit 53 (in this example, the output Bx−1 represents the color R) but also a signal for inverting the output Ax (of the latch circuit 51), from an invertor 59. The AND gate 54 detects whether or not D(X−2)−D(X−1)=0 is established for all the color components, i.e. it performs the detection in step 2 shown in FIG. 1.

An AND gate 55 functions as a second AND circuit, to which are applied the output Bx indicative of the colors R, G and B from the latch circuit 52 but also a signal for inverting the output (of the AND gate 54), from an invertor 56. The AND gate 55 detects whether or not D(X−1)−DX=0 is established for all the color components R, G, B, i.e. the detection in step 3 shown in FIG. 1.

The output Ax of the latch circuit 51 represents the result detected in step 1 in FIG. 1. When the output Ax has the level H, it is applied to OR gates 57 and 58 so as to create error data for preventing the carry. An output MSK of the OR gate 57 is used to control the mask circuit 34 (shown in FIG. 3), thereby masking the error data in the image data GD. The output SEL2 of the OR gate 58 controls the selector 23 so as to select the created error data ME2.

The output of the AND gate 54 is applied to an OR gate 60. In other words, when the AND gate 54 detects that D(X−1)−DX=0 is established, error data with the carry should be created. In such a case, the output SEL1 of the OR gate 60 is used to control the selector 23, thereby selecting the created error data ME1.

The output of the AND gate 55, which indicates the detected result in step 3, is applied to AND gates 61 and 62. Further, the AND gate 62 receives the signal A(X+1) indicative of the detected result in step 4. The AND gate 61 receives a signal for inverting the signal A(X+1), from the invertor 63. Therefore, when the AND gate 55 detects that D(X−1)−DX=0 is established for all of the color components, and when the absolute value of DX−D(X+1) is more than 8, the output of the AND gate 62 is applied to the OR gates 57 and 58 so as to create the error data without the carry. Conversely, when the foregoing absolute value is less than 8, the output of the AND gate 61 is applied to the OR gate so as to create the error data with the carry.

When D(X−2)−D(X−1)=0 is not detected by the AND gates 54 and 55, i.e. when the image is a natural image, all of the outputs MSK, SEL1 are SEL2 have the level L. Thus, the selector 23 selects the output of the error data storage circuit 25, and the mask circuit 34 outputs the error data in the image data GD as they are. The ordinary error diffusion process will be performed under the control of the reset control circuit 27.

FIGS. 7A to 11B show examples of reset patterns, each having a 16×16 pattern area, and examples of pixels where the carry signal is generated. In these drawing figures, horizontally arranged numerals denote pixel positions, and vertically arranged numerals denote line numbers.

FIG. 7A schematically shows the first reset pattern set in the reset pattern creating circuit 37. The first reset pattern is selected when the error data in the image data (GDE) denote "1" and "15". In this pattern, the error data are reset at the first pixel "1" with respect to the line "1". The reset circuit 26 is operated when the first pixel of the line "1" is latched by the latch circuit 21 in response to the dot clock DCK. Preset data to be preset in the dot counter 46 denote "14" which precedes "15" by one. For the line "2", preset data are "8". For the line "3", preset data are "2". The preset data are determined for the respective lines. In this reset pattern, a reset pixel position for a next line is displaced to the right by six pixels with respect to a preceding line. For instance, when continuous images having error data GDE denoting "1" (0001) are being displayed, a carry signal is generated at #-marked pixels shown in FIG. 7B.

The second reset pattern set in the reset pattern creating circuit 38 is schematically shown in FIG. 8A. In this pattern, a reset pixel position is displaced to the right by three pixels with respect to the preceding line. The pattern is selected when the error data in the image data are "2", "3", "8", "13" and "14". In this pattern, the error data are reset at the first pixel with respect to the line "1". Thus, the preset data is "14".

The preset data are determined for the respective lines, e.g. the preset data are "11" for the line "2", and "8" for the line "3". For instance, when continuous images having error data GDE denoting "8" (1000) are being displayed, the carry signal is generated at #-marked pixels as shown in FIG. 8B.

FIG. 9A schematically shows the third reset pattern set in the reset pattern creating circuit 39. In this reset pattern, a reset pixel position is displaced to the right by 14 pixels with respect to the preceding line. The reset pattern is selected when the error data in the image data are "4", "6", "10" and "12". Error data are reset at the first pixel with respect to the line "1". In this case, the preset data are "14".

The preset data are determined for the respective lines, e.g. the preset data are "0" for the line "2", and "2" for the line "3". For instance, when images whose error data GDE having "4" (0100) are displayed, carry signals are generated at the #-marked pixels as shown in FIG. 9B.

FIG. 10A schematically shows the fourth reset pattern set in the reset pattern creating circuit 40. In this pattern, a reset pixel position is displaced to the right by 11 pixels with respect to the preceding line, and is used when the error data are "5" and "11". The error data are reset at the first pixel with respect to the line "1". Thus, the preset data are "14". The preset data are determined for the respective lines, e.g. the preset data is "3" for the line "2", and "8" for the line "3". For instance, when the images whose image data always have error data GDE "5" (0101) are displayed, carry signals are generated at the #-marked pixels as shown in FIG. 10B.

The fifth reset pattern set in the reset pattern creating circuit 41 is schematically shown in FIG. 11A. In this pattern, a reset pixel position is displaced to the right by 13 pixels with respect to the preceding line. The error data are reset at the pixel "1" with respect to the line "1". The preset data are "14" in this case. This reset pattern is selected when the error data is "7" and "9". The preset data are determined for the respective lines as shown in FIG. 11A, e.g. the preset data are "1" for the line "2", and "4" for the line "3". For instance, when the images whose image data always have error data GDE "7" (0111) are displayed, the carry signals are generated at the #-marked pixels as shown in FIG. 11*b*.

The five reset patterns are available in this embodiment. Specifically, 15 reset patterns are available in accordance with respective values (1–15) of the pixel data. However, the pixel positions where the carry signals are generated for the error data "0" to "7" are opposite to those where no carry signals are generated for the error data "8" to "15". In other words, the pattern for uniformly distributing pixels where the carry signals are generated can be also used as the pattern for uniformly distributing pixels where no carry signals are generated. Further, similar reset patterns are united to one, thereby obtaining the five reset patterns.

The reset patterns are selected depending upon the values of the error data GDE as shown in FIGS. 7A to 11B. Thus, it is possible to prevent artifacts which are created by particular error data on a flat image in a computer-created image.

The following describe the error diffusion using the reset patterns, error diffusion by the created error data with the carry, and error diffusion by the created error data without the carry.

1. Error Diffusion Using the Reset Patterns:

This error diffusion is performed when the image identifying circuit 33 identifies a natural image. The error data storage circuit 25 has stored the error data EN of the processed image data of a pixel before the current pixel. The selector 23 applies the error data EN to the arithmetic circuit 22, which adds the error data EN to image data GD to be processed. In this state, the reset control circuit 27 selects a reset pattern in accordance with the error data GDE. The error data EN are reset at reset timing determined by the reset pattern. Referring to FIG. 2A, this process is conducted at the pixels except for the pixel n where an edge is detected.

2. Error Diffusion Using Created Error Data with the Carry:

The error diffusion is conducted when the image data Da arrives in succession and the image data Db whose difference from the image data Da is less than "8" arrive in succession at the pixel n and succeeding pixels as shown in FIG. 2B. For instance, the error data GDE of the image data Da is "1", the error decoder circuit 35, pattern signal creating circuit 36 and pattern selecting circuit 43 select the output RES1 and the CNT1 of the reset pattern creating circuit 43. In other words, the reset pattern shown in FIG. 7A is selected.

In response to the output SEL1 of the image identifying circuit 33, the selector 23 selects the error data ME1, and sends them to the arithmetic circuit 22. In this state, when a pixel of the image data GD stored in the latch circuit 21 is the pixel n–4, i.e. the pixel position "7" associated with the line "2", the dot counter 46 indicates "15", so the reset signal RES1 will be generated. Although this reset signal RES1 is valid for the natural image, it is however irrelevant in this error diffusion. In this error diffusion, since the pixel distance data PDD is "15", "1" is added in the adder 29. Therefore, the adder 29 generates an output "0". In the multiplying circuit 31, the error data GDE is multiplied by "0". The created error data ME1 will therefore be "0". The arithmetic circuit 22 adds "0" to the image data Da, i.e. the error data are reset.

In the case of the pixel n–3 (pixel position 8), the pixel distance data PDD is "0", and the adder 29 has an output "1". Thereafter, the error data GDE is multiplied by the output "1" of the adder 29, so the calculated error data ME1 is "1", and are added to the arithmetic circuit. In other words, the error data is added to the next pixel n–3.

The image data GD is Da until the pixel n–1, and changes from Da to Db at the pixel n (n=11). If the error data GDE in the image data GDE is "8", the reset control circuit 27 selects the reset pattern created by the reset pattern creating circuit 38, i.e. the reset pattern shown in FIG. 8A. In this state, the pattern selecting circuit 43 selects the count CNT2 of the dot counter 46 in the reset pattern creating circuit 38. The count CNT2 as the pixel distance data PDD is provided to the error data creating circuit 28. The error data creating circuit 28 creates error data ED to be added to the pixel n (=11) provided that the image data Db has been present before the pixel n. As can be seen in FIG. 8A, the error data ED to be added to the image data of the pixel "11" of the line "2" are seven times of the current error data GDE because the pixel position "11" is "7" after the reset pixel position "4". The dot counter 46 indicates "6" for the pixel n (=11) (i.e. this value corresponds to a value of a position of a pixel before the current pixel "10"), so "1" is added in the adder 29. The multiplying circuit 31 multiplies the added value "7" by the error data "8". The four lower bits of the derived product ("1000" of "111000") constitute error data ED to be added, and are outputted as ME1. Thus, the error data ME1 selected by the selector 23 is added to the image data Db at the pixel n (=11) by the arithmetic circuit 22. Further error data are created, in a similar manner, in the pixels after the pixel n–1, and are added to the image data GD.

The error data ME1 is created as described above. Then, the error diffusion is performed provided that the image data GD has been continuous before the image data are changed to the current image data. The calculated (created) error data are used not only when the image data GD is changed to another image data (for example, from Da to Db) but also when the same image data GD has been consecutive. However, the same results can be accomplished even when the created error data are used only after the image data GD is changed from one to another, and when the error diffusion is performed using the reset error data while the same image data has been consecutive. In such a case, it is necessary to provide a step for confirming whether or not D(X–1)–DX= 0, after steps 2 and 4, which would complicate the detecting circuit.

3. Error Diffusion by Creating Error Data Without the Carry:

This error diffusion is performed when the edge is detected, i.e. a difference between the image data Da and Db is more than "8", as shown in FIGS. 2C and 2D. In the case of the 1-pixel and 2-pixel checkered patterns shown in FIGS. 2C and 2D, artifacts would be caused by the error diffusion. To overcome this problem, the error diffusion will be conducted by creating error data without the carry. However, if the error diffusion is simply interrupted after detection of the difference between the image data Da and Db is more than 8, the following problem will occur. Specifically, when the same image data Db1 are continuous in pixels following the pixel n in the case of a natural image shown in FIG. 2, the image will become poor. This is because no error data have been stored for the pixel after the pixel n (i.e. n+1, n+2, . . . ). To overcome this problem, addition of the error data is interrupted once an edge having a remarkably different level of brightness (more than "8") is detected, and no error data will be added to the image data of the pixel n, but error data to be added to image data of a succeeding pixel n+1 are created.

When a difference between the pixel n and the pixel n−1 is recognized to be more than "8", the outputs MSK and SEL2 will have the level H in response to the output of the latch circuit 51. Then, the selector 23 applies the error data ME2 to the arithmetic circuit 22. Thereafter, the mask circuit 34 masks the error data GDE.

Assume that the error data GDE of the image data Db is "8" as before, and that the position of the pixel n resides at the line "2" and the pixel position "11". Further, it is assumed that the image data GD of the pixel n are consecutive in the succeeding pixels. The error data ED for the pixel n+1 (=12) are calculated by 8×8, because the error data GDE is "8" and the pixel position "12" is "8" after the reset position of the pixel "4".

The adder 30 adds "2" to the count "6" of the dot counter 46. Then, the multiplying circuit 32 multiplies the added data "8" with the error data "8". The four lower bits of the derived product ("0000" of "1000000") are outputted as error data ME2. Thus, the error data ME2 selected by the selector 23 is added in the arithmetic circuit 22. Since the four lower bits of the image data GD are "0", no carry signal will be generated after the addition. The error data ME2 is outputted to the four lower bits as they are. The error data EN is stored in the error data storage circuit 25. Therefore, the error data ED is essentially not added to the image data GD at the pixel n, but error data EN to be added to the pixel n+1 (=12) will be created.

When the difference between the image data at the pixels n+1 and n (shown in FIG. 2C) or the difference between the pixels n+1 and n+2 is more than "8", the error data EN stored in the error data storage circuit 25 is not added to the image data GD of the pixel n+1 so that the selector 23 selects the error data ME2, as described above.

On the other hand, when the image data GD of the pixel n+1 is identical to that of the pixel n, the selector 23 selects the error data EN stored in the error data storage circuit 25. The selected error data EN is added to the image data GD.

What is claimed is:

1. A method of processing a color image having a plurality of color image data representing a respective pixel, the method comprising the steps of:
   (a) calculating a first difference between image data D(x) and image data D(x−1) constituting the color image wherein one of the second adjacent two pixels is one of the first adjacent pixels; and the other of the second adjacent two pixels is not the other of the first adjacent two pixels.
   (b) comparing the difference derived in step (a) with a predetermined value m and detecting a border of the color image when the difference is more than the predetermined value m;
   (c) when the difference calculated in step (a) is equal to or less than m, checking whether image data D(x) and image data D(x−2) are identical for all of the color components constituting the color image;
   (d) identifying the color image as a computer-created image or a natural image based on a conclusion of steps (b) and (c); and
   (e) processing the color image in a different manner depending upon the border detected in the step (b), and the computer-created or natural image identified in the step (d).

2. The method as in claim 1, wherein in step c), it is checked whether or not the differences derived for the respective color components are zero and, in step d), a computer-created image is identified when the differences are zero.

3. The method as in claim 2, wherein in steps a) and c), differences between data of three images sequentially supplied are calculated so as to derive two differences between the image data, and in step d), the color image is identified as being a natural image when the two derived differences are not zero for the color components constituting the color image.

4. The method as in claim 1, wherein in step e), error diffusion is performed by adding error data to the image data, using higher bits of added image data as image display data and storing the remaining lower bits of the added image data to be added to image data supplied to a succeeding pixel as the error data, and the error diffusion is performed in a different manner depending upon the border of the image, the computer-created image and the natural image.

5. The method as in claim 4, wherein in step e), error data are created assuming that the image data indicative of the border have been present at preceding pixels, and created error data are stored as error data to be added to a succeeding pixel.

6. The method as in claim 4, wherein in step e), error data are created assuming that the image data indicative of the computer-created image have been present at the preceding pixels, and created error data are added so as to perform the error diffusion.

7. The method as in claim 4, wherein the predetermined value m is a value represented by the most significant bit in the error data.

8. An image identifying apparatus for identifying a kind of color image on the basis of image data supplied pixel by pixel, the image identifying apparatus comprising:
   (a) a plurality of delay circuits, each for delaying image data of one of a plurality of color components, supplied in synchronization with dot clocks, during one dot clock;
   (b) a plurality of subtractor circuits, each for calculating an absolute value of a difference between each color component of currently supplied image data and image data of a previous pixel from the delay circuit;
   (c) comparators, each for comparing an output of the subtractor circuit with predetermined values m and 0, and generating a first signal when the output of the subtractor circuit is more than the predetermined value m, and a second signal when the output of the subtractor circuit is 0;
   (d) a plurality of first storage circuits, each for storing the first signal during one dot clock;
   (e) a plurality of second storage circuits, each for storing the second signal during one dot clock and two dot clocks;
   (f) a first AND circuit for deriving for each color component an AND of the second signals stored in the second storage circuits during two dot clocks and the inverted form of the first signals stored in the first storage circuits during one dot clock; and (g) a second AND circuit for deriving for each color component an AND of the second signals stored in the second storage circuits during one dot clock and the inverted form of the output of the first AND circuit; and (h) a logic circuit for generating a signal indicative of an identified result on the basis of outputs of the first storage circuits, the first AND circuit, the second storage circuits, and the second AND circuit.

9. An image processing apparatus for processing color image data sequentially supplied pixel by pixel, the apparatus comprising:

(a) an arithmetic circuit for adding error data to currently supplied image data and obtaining corrected image data;

(b) an error data storage circuit for storing a predetermined number of lower bits of the corrected image data as error data for the image data of a succeeding pixel;

(c) an error data creating circuit for creating error data by assuming that the image data identical to the supplied image data have been continuously supplied;

(d) a selector circuit for replacing the error data stored in the error data storage circuit with the error data created by the error data creating circuit;

(e) a carry inhibiting circuit for preventing the arithmetic circuit from performing an addition causing a carry for a predetermined number of upper bits of the supplied image data;

(f) a delay circuit for delying image data, supplied in synchronization with dot clocks, during one dot clock;

(g) a subtractor circuit for calculating an absolute value of a difference between currently supplied image data and image data of a preceding pixel, from the delay circuit;

(h) a comparator for comparing an output of the subtractor circuit with a predetermined value m and O, and generating a first signal when the output of the subtractor circuit is more than the predetermined value m, and a second signal when the output of the subtractor circuit is O;

(i) a first storage circuit for storing the first signal during one dot clock;

(j) a second storage circuit for storing the second signal during one dot clock and two dot clocks;

wherein the image processing apparatus has the foregoing circuits (a) to (j) for each of a plurality of color components of the image data, and the apparatus further comprises:

(k) a first AND circuit for deriving for each color component an AND of the second signals stored in the second storage circuits during two dot clocks and the inverted form of the first signals stored in the first storage circuits during one dot clock;

(l) a second AND circuit for deriving for each color component an AND of the second signals stored in the second storage circuits during one dot clock and the inverted form of the output of the first AND circuit; and (m) a logic circuit for generating a signal indicative of an identified result on the basis of outputs of the first storage circuits, the first AND circuit, the second storage circuits, and the second AND circuit.

10. The apparatus as in claim 9, wherein the predetermined value m is a value represented by the most significant bit in the error data.

11. An image processing apparatus for processing color image data sequentially supplied pixel by pixel, the apparatus comprising:

(a) an arithmetic circuit for adding error data to currently supplied image data and obtaining corrected image data;

(b) an error data storage circuit for storing a predetermined number of lower bits of the corrected image data as error data for a succeeding pixel;

(c) an error data creating circuit for creating error data by assuming that the image data identical to the supplied image data have been supplied;

(d) a selector circuit for replacing the error data stored in the error data storage circuit with the error data created by the error data creating circuit; and (e) a control circuit for controlling the selector circuit such that after the comparison among differences between the currently supplied image data and image data at a pixel before the current pixel, between the image data at a pixel before the current pixel and image data at two pixels before the current pixel, and between the current image data and image data at a pixel after the current pixel, it is detected whether or not the difference between the current image data and the image data at a pixel before the current pixel, or the difference between the current image data and the image data at a pixel after the current pixel is greater than a predetermined value, wherein if the difference is greater than the predetermined value, the presence of a boundary between images is determined, and the error data created by the error data creating circuit is supplied to the arithmetic circuit instead of the error data of the current image data, while if the difference is smaller than the predetermined value, it is detected whether or not both differences between the current image data and the image data at a pixel before and the image data of two pixels before the current pixel are identical with respect to each color component, wherein when both differences are not identical, it is determined that the current image data is of a natural image so that the error data of the image data is supplied to the arithmetic circuit, and when either the differences between the current image data and the image data at a pixel before the current pixel, or the difference between the image data at a pixel before and the image data at two pixels before the current data is identical with respect to each color component, it is determined that the current image data is of a computer-created image so that the error data created in the error data creating circuit is supplied to the arithmetic circuit instead of the error data of the current image data.

12. The apparatus as in claim 11, wherein the error data creating circuit creates error data to be added to the image data just after the image data are changed.

13. The apparatus as in claim 11, wherein the error data creating circuit creates error data for addition to the image data next to the image data just after the image data are changed.

14. The apparatus as in claim 11, further including:

(f) a reset circuit for resetting error data in the error data storage circuit; and (g) a reset control circuit having a plurality of reset patterns, selecting one of the reset patterns in accordance with error data of the supplied image data, and controlling the reset operation of the reset circuit in accordance with the selected reset pattern.

15. The apparatus as in claim 14, further including:

(h) a decoder circuit for decoding error data in the supplied image data;

wherein the reset control circuit selects one of the reset patterns in accordance with a decoding output of the decoder circuit.

16. The apparatus as in claim 15, further including a pixel distance data creating circuit for creating, in accordance with the reset pattern selected by the reset control circuit, pixel distance data indicative of a distance between a pixel where error data are reset and a pixel where the image data are supplied, wherein the error data creating circuit creates error data to be stored in the error data storage circuit, in accordance with the error data in the image data and by assuming that a number, in accordance with the pixel distance data, of image data identical to the supplied image data were supplied prior to the supplied image data.

17. An image processing apparatus for processing color image data sequentially supplied pixel by pixel, the apparatus comprising:

(a) a difference calculating circuit for calculating differences between image data $D(x)$ and image data $D(x-1)$ the image data $D(x)$ and image data $D(x-2)$ are identical with respect to all of the color components constituting the color image; and (c) an identifying circuit for identifying, based on the compared results, that supplied image data represent a border of the color image, a computer-created image or a natural image, and generating a signal indicative of the identified image wherein one of the second adjacent two pixels is one of the first adjacent pixels; and the other of the second adjacent two pixels is not the other of the first adjacent two pixels.

* * * * *

UNITED STATES PATENT AND TRADEMARK OFFICE
CERTIFICATE OF CORRECTION

PATENT NO : 6,118,905
DATED : September 12, 2000
INVENTOR(S): Hisao UEHARA; Mitsugu KOBAYASHI; Makoto FUJIOKA; Kenji SAIKI; Makoto KITAGAWA; Yusuke TSUTSUI It is certified that error appears in the above-identified patent and that said Letters Patent are hereby corrected as shown below:

Col. 1, line 75, change "Makoto Kitagawa, Gunfu" to --Makoto Kitagawa, Anpachi-gun--.

Signed and Sealed this

Twenty-second Day of May, 2001

*Attest:*

NICHOLAS P. GODICI

*Attesting Officer*     *Acting Director of the United States Patent and Trademark Office*